April 28, 1936.  M. POPPER  2,038,853
OVERSEAMING AND PINKING MACHINE
Filed Dec. 28, 1934  10 Sheets-Sheet 1
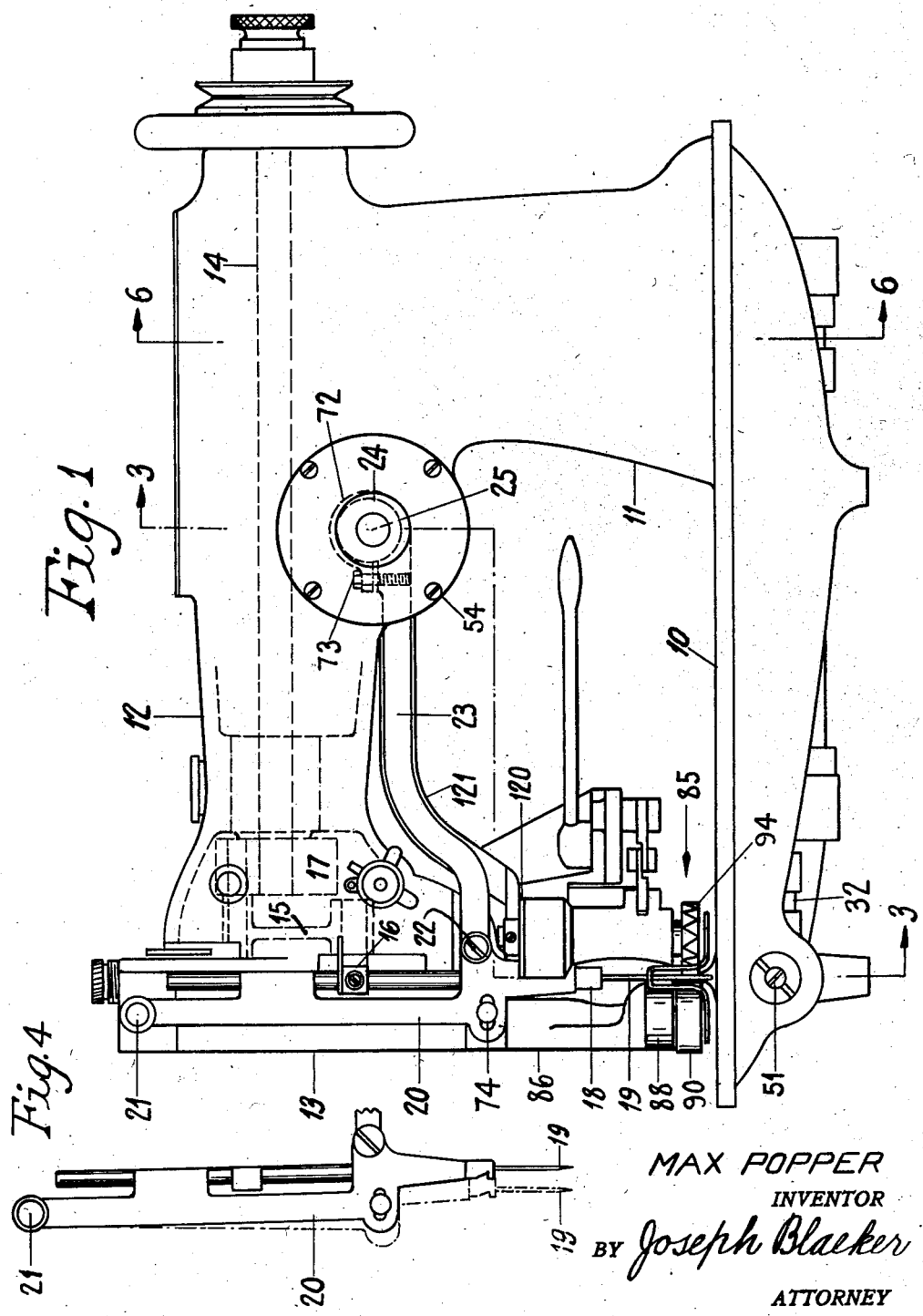
MAX POPPER
INVENTOR
BY Joseph Blacker
ATTORNEY

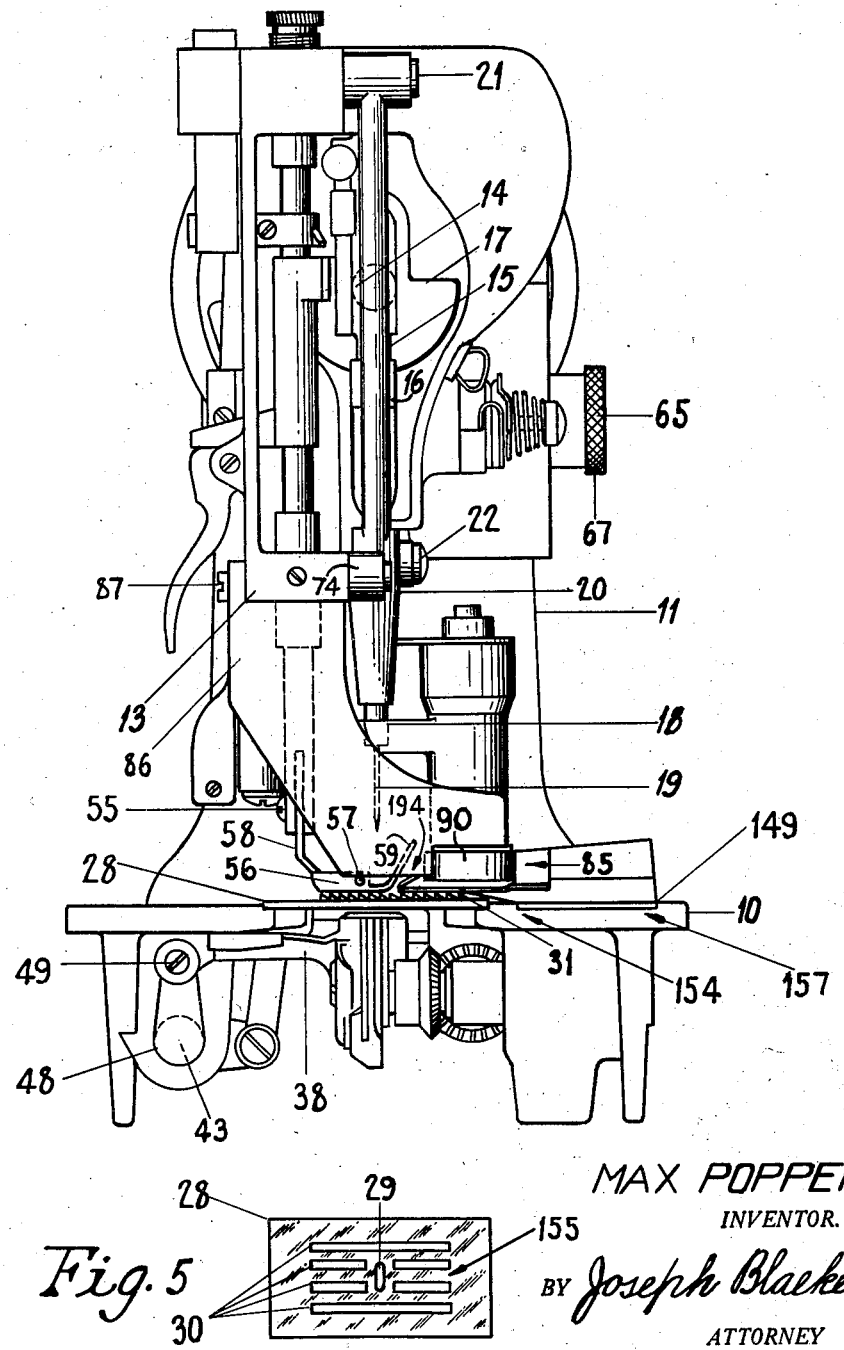

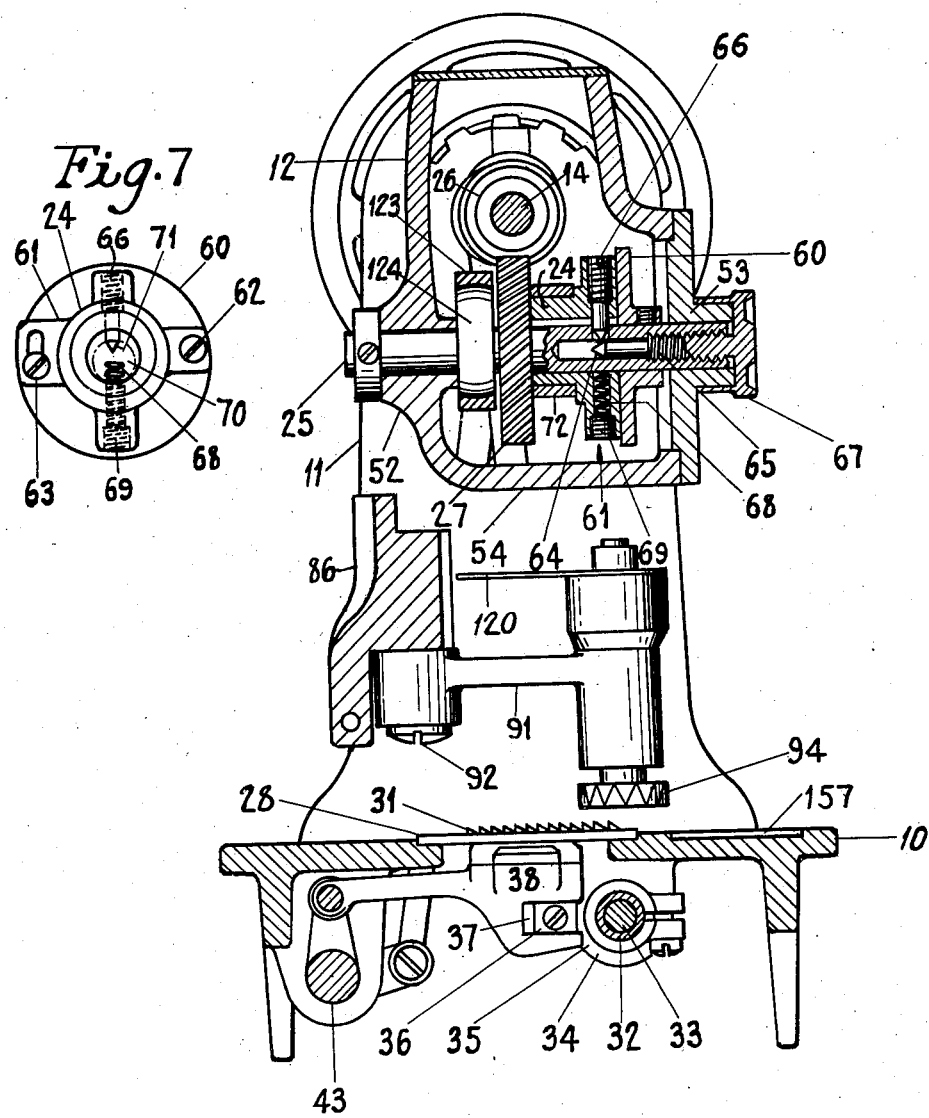

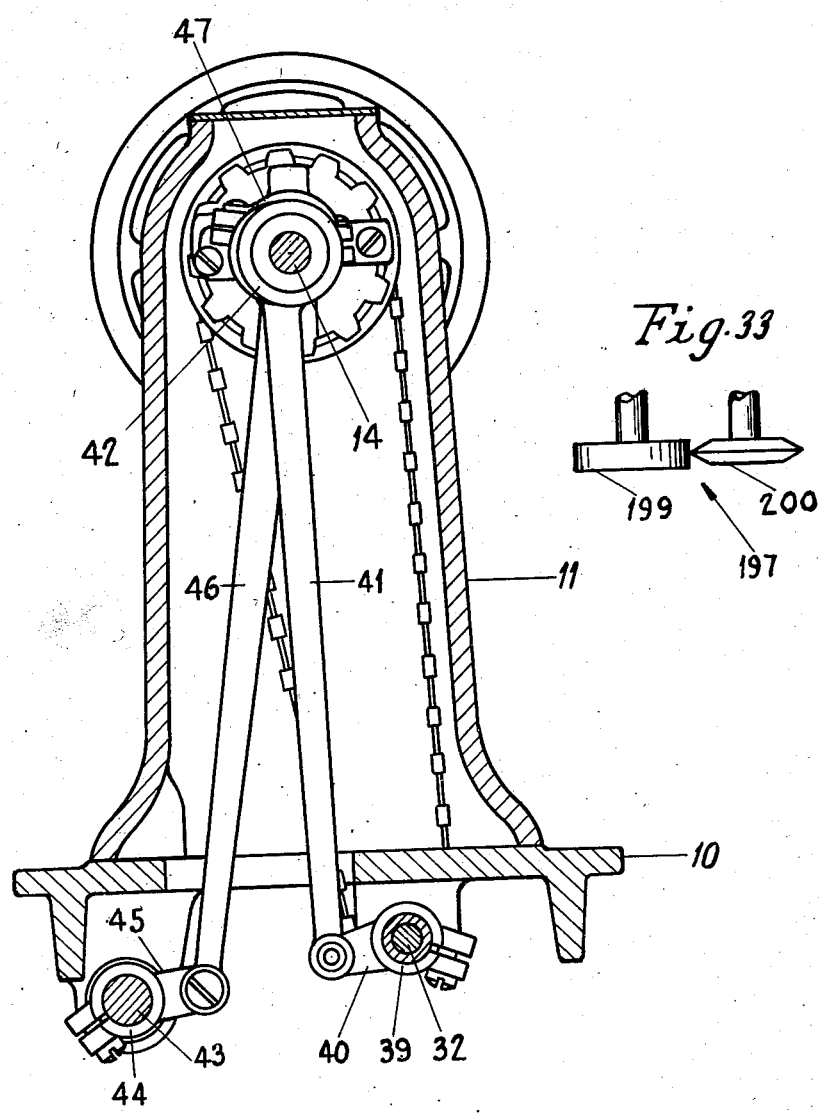

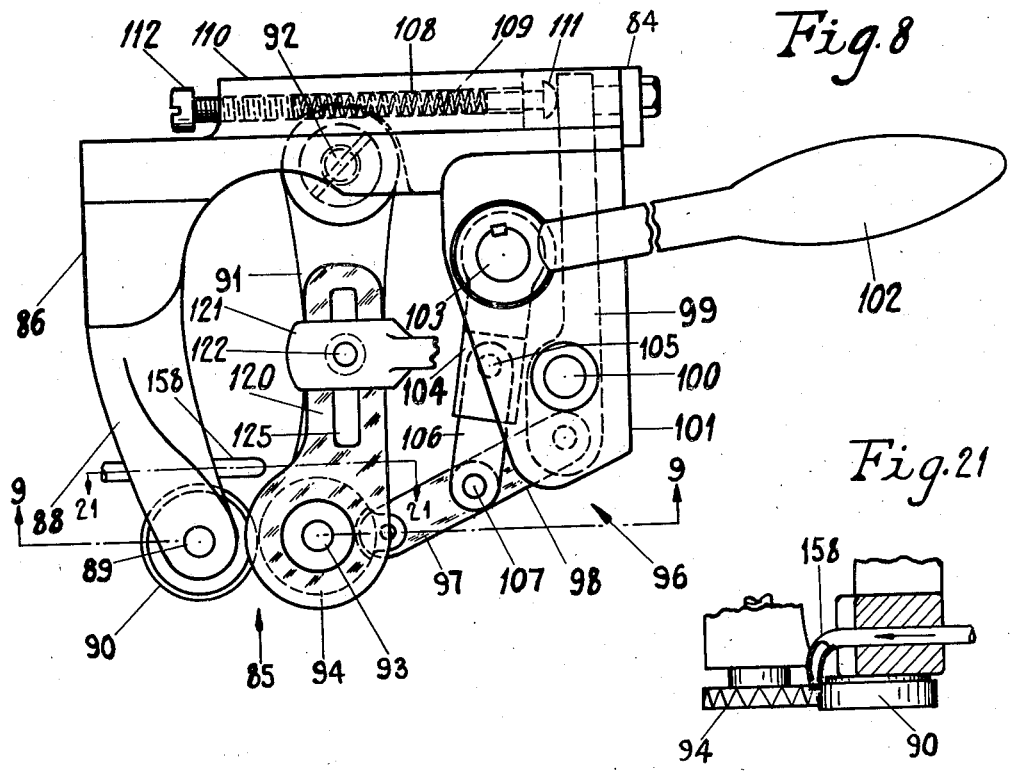
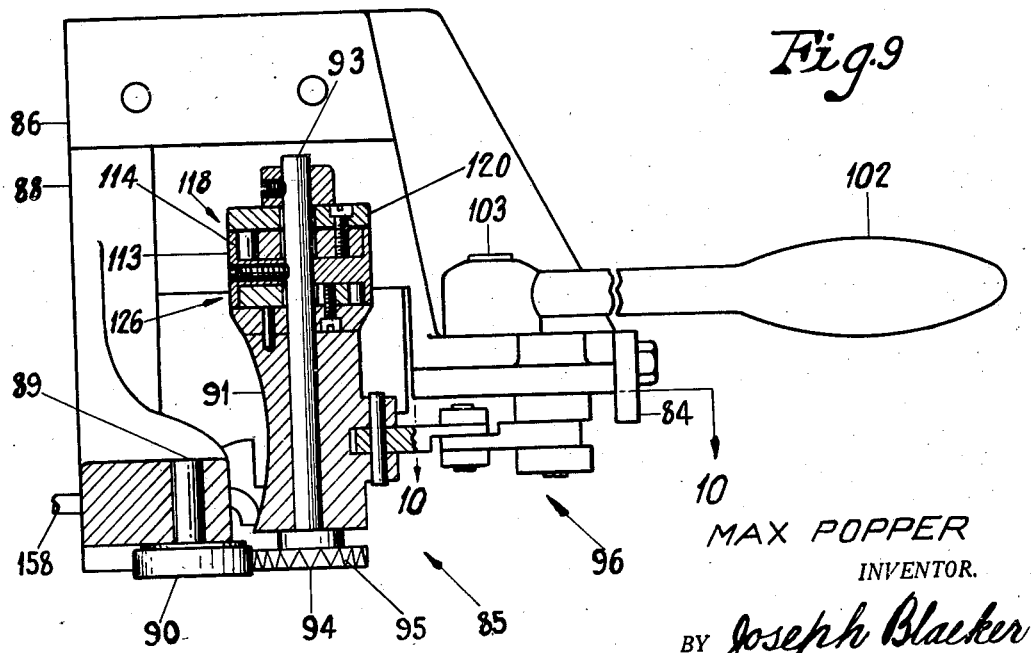

April 28, 1936. M. POPPER 2,038,853
OVERSEAMING AND PINKING MACHINE
Filed Dec. 28, 1934 10 Sheets-Sheet 6

MAX POPPER
INVENTOR.
BY Joseph Blacker
ATTORNEY

April 28, 1936. M. POPPER 2,038,853
OVERSEAMING AND PINKING MACHINE
Filed Dec. 28, 1934 10 Sheets-Sheet 7
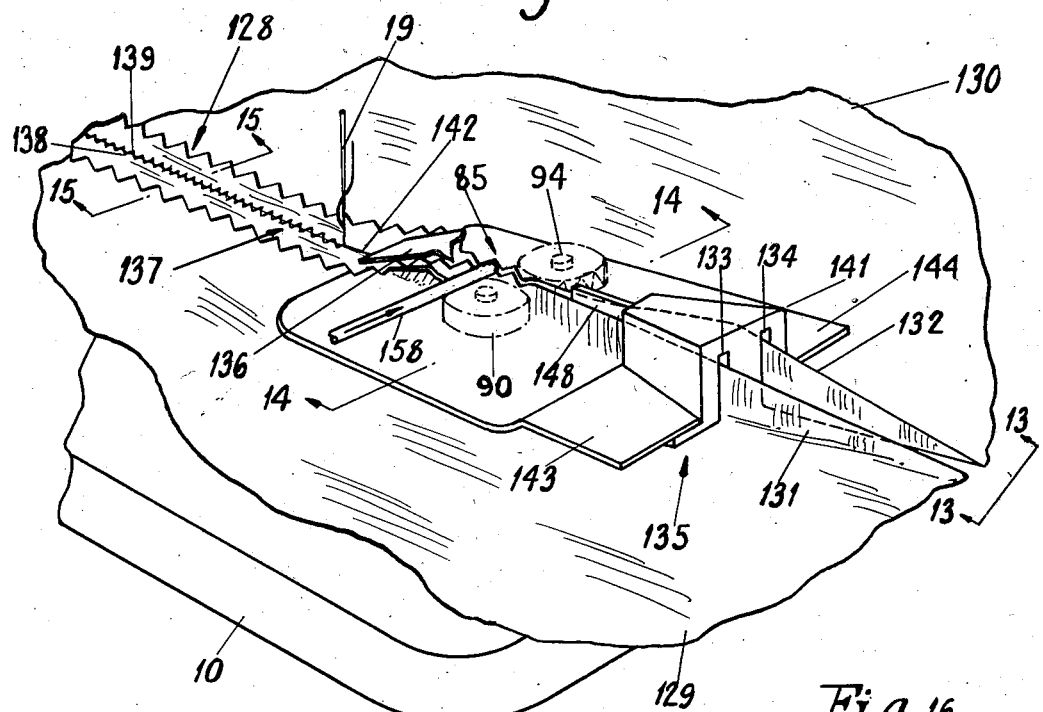
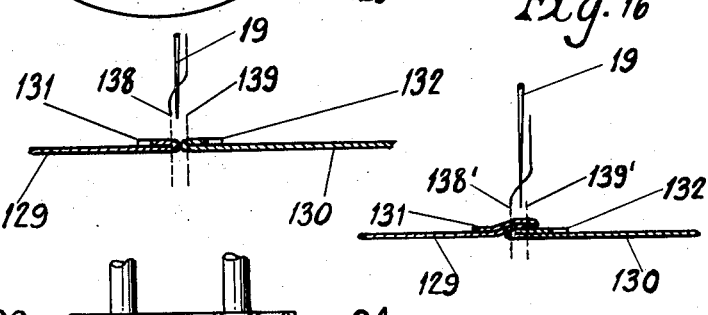
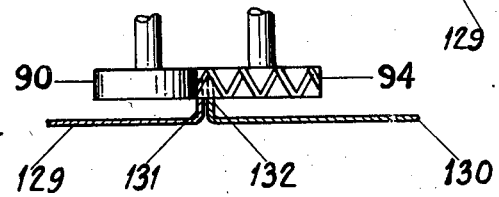
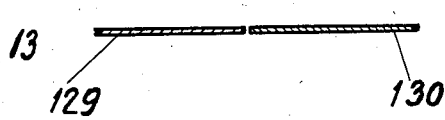
MAX POPPER
INVENTOR.
BY Joseph Blacker
ATTORNEY

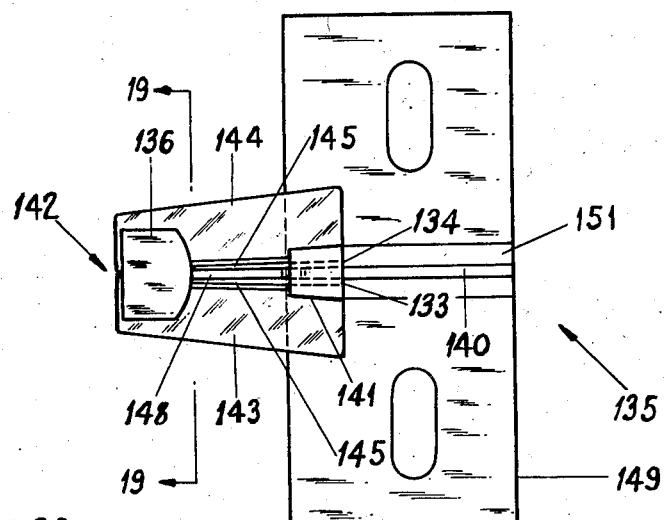
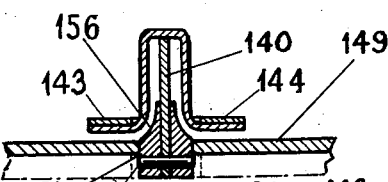
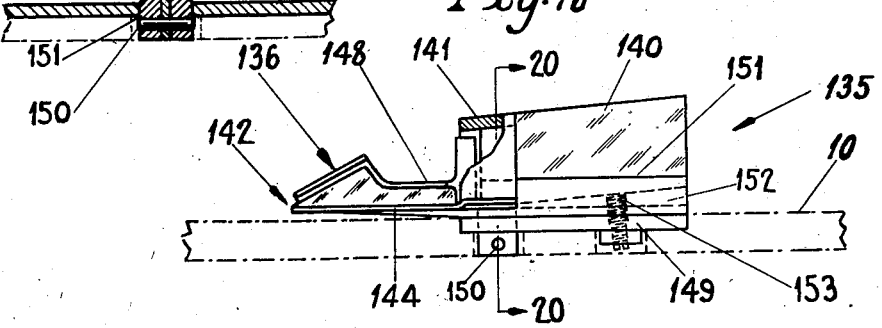
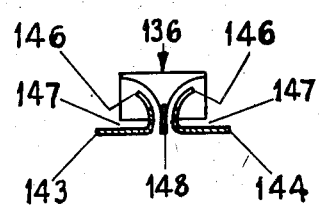

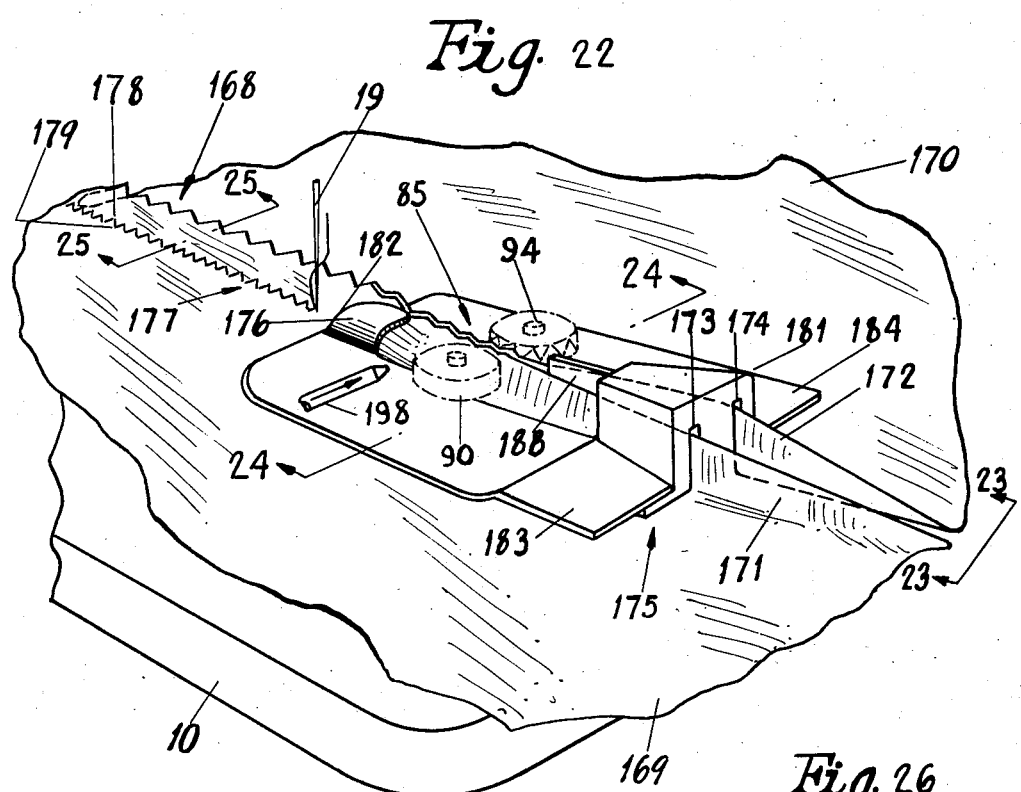
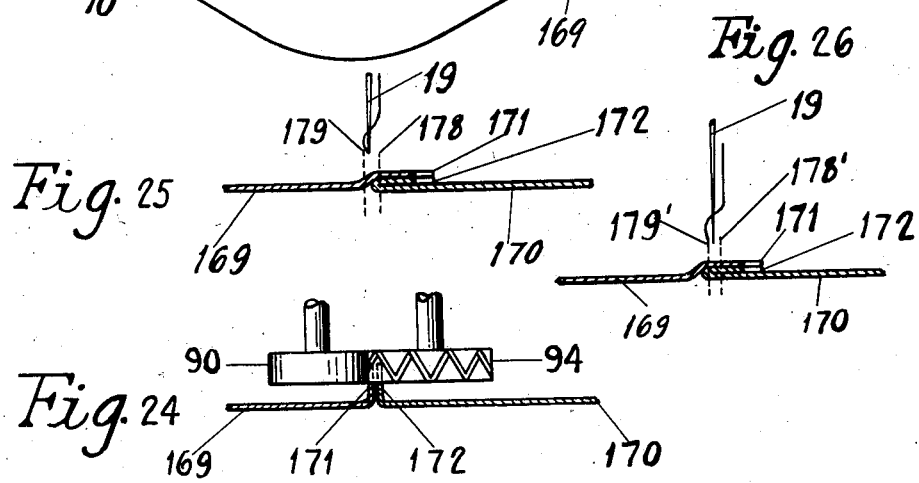
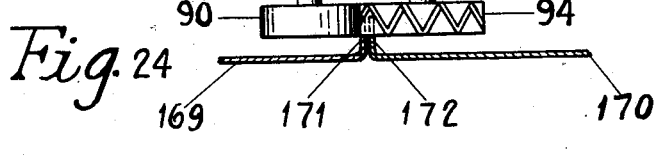
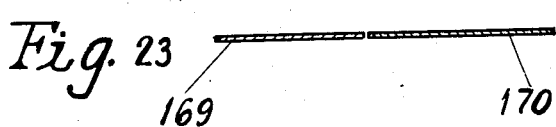

April 28, 1936.   M. POPPER   2,038,853
OVERSEAMING AND PINKING MACHINE
Filed Dec. 28, 1934   10 Sheets-Sheet 10
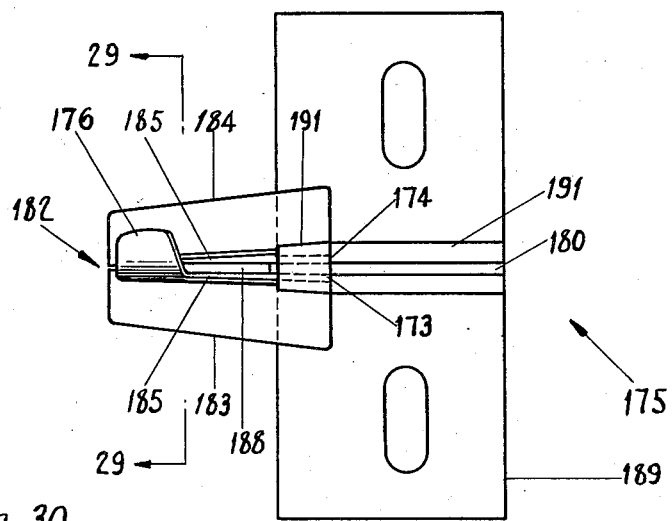
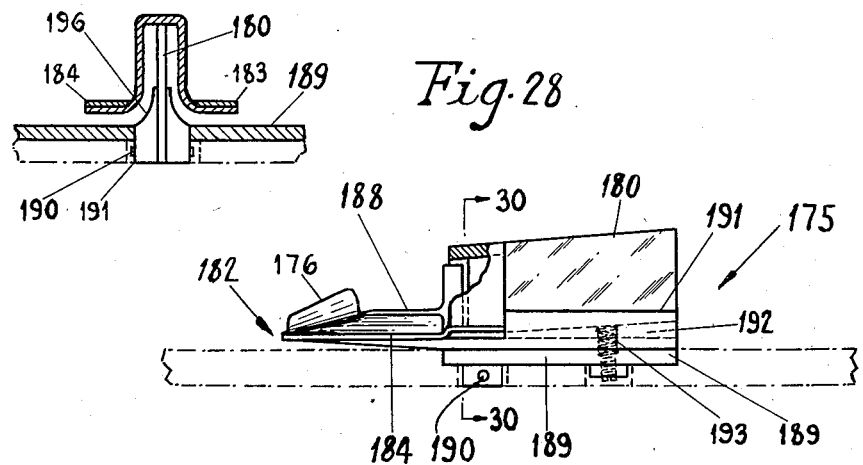
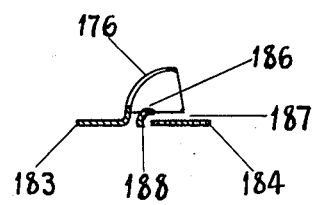
MAX POPPER
INVENTOR.
BY Joseph Blacker
ATTORNEYS.

Patented Apr. 28, 1936

2,038,853

UNITED STATES PATENT OFFICE 2,038,853

OVERSEAMING AND PINKING MACHINE

Max Popper, Brooklyn, N. Y., assignor to Topstitch Machine Corp., New York, N. Y., a corporation of New York Application December 28, 1934, Serial No. 759,449

100 Claims. (Cl. 112—124)

This invention relates to a combined overseaming and pinking machine operative in unison to simultaneously design trim and overseam, thereby avoiding the necessity of first stitching and pinking, and then overseaming to produce what is known in the art as a zig-zag top-stitched, pinked or trimmed seam.

An object of this invention is to provide an overseaming and pinking machine in which the pinking mechanism is mounted entirely above the needle plate and above the work supporting base of the sewing machine so as to facilitate the feeding and handling of the fabric sections.

Another object of this invention is to provide an overseaming and pinking machine having means for blowing a jet of air in a direction to assist folding the trimmed edges of the fabric and to cause the removal of the pinked clippings.

Another object of this invention is to provide a pinking unit comprising two rotary cooperating members which can be rigidly attached to the head of a sewing machine and above and free of the base and be actuated by the driving mechanism of the sewing machine.

Another object of this invention is to provide a pinking mechanism of the character described, operated by a horizontal arm from a transverse shaft below the overhanging arm of the sewing machine so as to simplify the actuating mechanism of the cutting members.

Another object of this invention is to provide a combined overseaming and trimming machine having a pinking unit positioned entirely above the base of the sewing machine and including a rotary pinking wheel and a cooperating cylindrical member, guiding means in front of the pinking unit for upfolding fabric sections on said base, further guiding means in the rear of the pinking wheel for downfolding the pinked fabric before reaching the needle and having means for forcing the pinking wheel against the cylindrical member to produce a pinked zig-zag topstitch seam in one operation.

Another object of this invention is to provide a combined overseaming and pinking machine designed to produce a reinforced pinked seam having zig-zag stitches over the folded portion of the seam, the said seam being stronger than an ordinary pinked seam made on a straight line stitching and pinking machine which is well-known in the art.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:—

Figure 1 is a front elevation of a zig-zag sewing machine well known to the art as a Singer 107W—with my improved pinking mechanism applied thereto.

Figure 2 is a front end elevation of the machine.

Figure 3 is a sectional view of the overhanging arm and the front end portion of the work supporting base, the section being taken as on line 3—3 in Figure 1, and showing a feed-dog and its carrier in full lines, and the feed rock-shaft and hook driving shaft in section.

Figure 4 is a diagrammatic view of the successive angular positions assumed by the needle.

Figure 5 is a plan view of the throat or needle-plate.

Figure 6 is a sectional view of the overhanging arm and the tubular standard, the section being taken as on line 6—6 in Figure 1.

Figure 7 is a front elevation of a portion of the needle vibrating mechanism shown in section in Figure 3.

Figure 8 is a plan view of the pinking unit.

Figure 9 is a vertical sectional view of the pinking unit, the section being taken as on line 9—9 in Figure 8.

Figure 12 is a perspective view showing the manner of placing, upturning, pinking, downfolding the edges of the sections of fabrics with the pinked edges respectively facing in opposite directions, and uniting the folded edges by zigzag topstitching, in successive steps and in one continuous operation.

Figure 13 is a sectional view taken as on line 13—13 in Figure 12.

Figure 14 is a sectional view taken as on line 14—14 in Figure 12.

Figure 15 is a sectional view taken as on line 15—15 in Figure 12.

Figure 16 is a cross-sectional view of a modified pinked and topstitched seam, wherein the pinked fabric edges are in superposed relation and all the stitch lines pass through four layers of fabric.

Figure 17 is a plan view of the folder used for producing the seam shown in Figure 12.

Figure 18 is a side view of the folder set in the base-plate of the sewing machine.

Figure 19 is a sectional view of the folder shown in Figures 17 and 18, the section being taken as on line 19—19 in Figure 17.

Figure 20 is a fragmentary sectional view of the folder, the section being taken as on line 20—20 in Figure 18.

Figure 21 is a sectional view of the pinking mechanism showing air means for removing the pinked clippings, the section being taken as on line 21—21 in Figure 8.

Figure 22 is a perspective view showing the manner of placing, upturning, pinking, downfolding the edges of the sections of fabric with the pinked edges in superposed relation and facing in one direction, and uniting the folded edges by zig-zag topstitching in successive steps and in one continuous operation.

Figure 23 is a sectional view taken as on line 23—23 in Figure 22.

Figure 24 is a sectional view taken as on line 24—24 in Figure 22.

Figure 25 is a sectional view taken as on line 25—25 in Figure 22.

Figure 26 is a cross-sectional view of a modified pinked and topstitched seam, wherein the pinked fabric edges are in superposed relation and all the stitch lines pass through three layers of fabric.

Figure 27 is a plan view of the folder used for producing the seam shown in Figure 22.

Figure 28 is a side view of the folder shown in Figure 27 set in the base-plate of the sewing machine.

Figure 29 is a sectional view of the folder shown in Figures 27 and 28, the section being taken as on line 29—29 in Figure 27.

Figure 30 is a fragmentary sectional view of the folder shown in Figures 27 to 29, inclusive, the section being taken as on line 30—30 in Figure 28.

Figure 31 shows a view of a zig-zag seam before stretching along the line of the seam.

Figure 32 shows a view of a zig-zag seam when stretched along the line of the seam.

Figure 33 shows in diagrammatic form a trimming unit adapted for straight line trimming of the edges of fabric sections to produce a trimmed non-ornamented edge.

Figure 10:
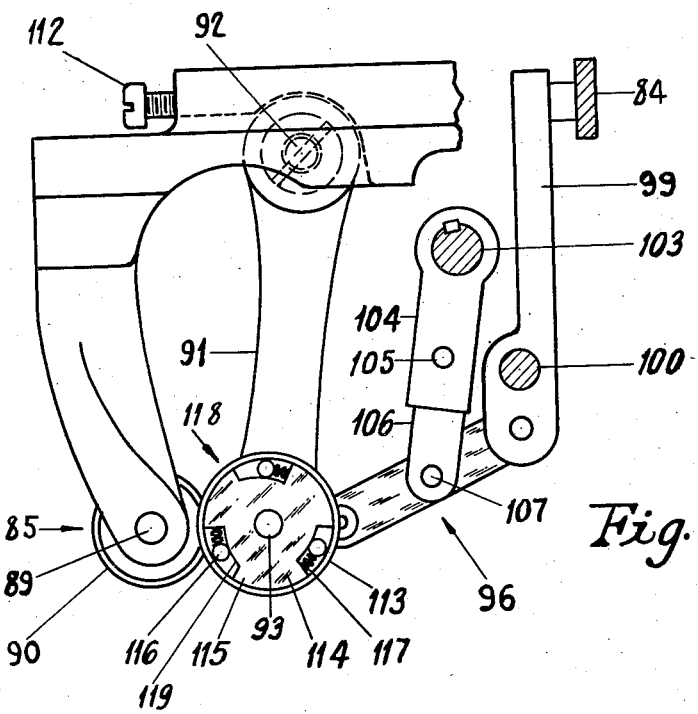
Figure 10 is a sectional plan view of the pinking unit, showing the clutch used for actuating the rotary cutter; the section being taken as on line 10—10 in Figure 9.

In the illustrated embodiment of the invention, the numeral 10 indicates the work supporting base of a sewing machine embodying my invention and which comprises the usual tubular standard 11, having an overhanging arm 12 with a head 13 at its free end. A main actuating or needle-bar shaft 14 has been mounted in the arm 12 and carries a needle-bar link 15. The link 15, operatively connects, through the needle-bar collar 16 and disk 17, the shaft 14 with the needle-bar 18.

The needle-bar 18 carries a needle 19 and is housed in a swinging needle-bar frame 20 which is pivoted at its upper end at 21 to the head 13. A stud 22 has been secured to the swinging needle-bar frame 20 at its lower end. A needle-vibrating connection 23 has been fulcrumed at one end on the stud 22 and is mounted at the other end on an adjustable eccentric 24 carried by a transverse shaft 25. The transverse shaft 25 is mounted in bearings 52 and 53 carried by a curved junction member 54 between the tubular standard 11 and the arm 12, as best shown in Figure 3.

The transverse shaft 25 is operatively connected with the main shaft 14 by a gear 26 carried by said main shaft and meshing with a gear 27 carried by said transverse shaft, the ratio of said gears being as one to two, thus giving the transverse shaft one rotation to two rotations of said main shaft. The eccentric bearing 24 imparts to the connection 23 and to the needle-bar frame 20 and to the needle 19 vibratory movements in a direction transverse to the motion of the feed-dog and transverse to the direction of the feed of the material. Due to the pivotal mounting of the swinging needle-bar frame 20, the needle-bar 18 and the needle 19 in the embodiment shown, must assume an angular position either to the left or to the right of the center of the loop taker shaft 51 when the needle enters the throat plate in angular relation, as shown in Figure 4. It will thus be noted that the needle bar 18 is not reciprocable in fixed bearings in the head 13 of the sewing machine. It is also to be noted that the needle bar operates in a swinging frame which provides movable bearings for the needle bar and that the needle 19 enters the throat plate at two points spaced apart and transverse to the line of feed, which is contrary to the straight line motion of a vertically reciprocable needle which has fixed bearings in the head of the sewing machine and which produces straight line stitching and which must enter the throat plate only at one fixed point. To accommodate the transverse motion of the needle, the throat plate 28 has been formed with a wide slot 29 transverse to the line of feed, as shown in Figure 5. The throat plate 28 is fastened to the work supporting base 10 and has slots 30 to receive the conventional intermittent 4-motion feed-dog 31. A tubular feed lift rockshaft 32 carries the hook-driving shaft 33. As best shown in Figure 3, the forward end of the tubular rock-shaft 32 carries a collar 34 provided with an arm 35 having a slide 36 designed to enter a slot 37 formed in the feed-dog carrier 38. At the rear end of the tubular rock-shaft 32, best shown in Figure 6, there is secured a collar 39, having an arm 40 which is pivotally attached to the lower end of a pitman connection 41. The upper end of the pitman 41 engages an eccentric 42 secured on the main shaft 14. From the foregoing it will be understood that the rotary movements of the eccentric 42 on the main shaft 14 through suitable connections impart vertical movements to the feed-dog 31.

A feed rock-shaft 43 is secured by a pinch collar 44 having an arm 45 which is pivotally attached to the lower end of a pitman connection 46. The upper end of the pitman 46 engages an eccentric 47 secured to the main shaft 14. As best shown in Figure 2, the forward end of the feed rock-shaft 43 has a yoke-shaped portion 48 into which is mounted a shaft 49 upon which one end of the feed-dog carrier 38 is pivoted. From the foregoing it will be understood that the rotary movements of the eccentric 47 on the main shaft 14 through suitable connections, impart feed movements to the feed-dog 31.

As best shown in Figure 2, a presser-bar 55 mounted in the head 13 is depressed in the usual manner by the commonly employed presser-bar spring (not shown). A presser-foot 56 cooperates with the feed-dog 31, to feed the work. The presser-foot 56 may be pivotally secured by a pin 57 to the lower end of the cloth-presser bracket 58 which is secured to the presser-bar 55. The forward end of the presser-foot 56 has a wide slot corresponding to the slot 29 in the throat plate 28 and terminates in an upwardly and forwardly sloping extension 59.

As shown in Figure 3, a disk 60 has been secured to the transverse shaft 25 and a frame 61, best shown in Figure 7 has been adjustably pivoted to the disk 60 by a pivot screw 62 and a steadying screw 63. The frame 61 is formed with the integral eccentric bearing 24, thus permitting the frame 61 and eccentric bearing 24 to be adjusted on the pivot screw 62 eccentric to the transverse cam shaft 25. The desired adjustment of the frame 61 and eccentric bearing 24 is effected by the taper 64 of a screw 65 acting upon the inner end of a screw 66 which latter is threaded into the frame 61. The screw 65 is threaded into the cam shaft 25 and has a knurled head 67. A spring 68 has been mounted in the frame 61, opposite the screw 66, the spring 68 being held compressed between the cam shaft 25 and a screw 69. In Figure 7, the cam shaft 25 is omitted, such figure comprising only the frame 61, eccentric bearing 24, spring 68 and screws 62, 63 and 69; accordingly, the spring 68 is shown as extending into the shaft hole 70 of the disk 60. As the screw 65 is turned outward, the taper 71 of the screw 66, through the action of the spring 68, rides the taper 64 of the screw 65, thus causing the eccentric bearing 24 to assume a position less eccentric to the cam shaft 25.

The needle-vibrating connection 23 has one end mounted upon the eccentric bearing 24 by the employment of an eccentric strap 72, which is provided with an adjusting screw 73. The opposite end of the connection 23 is pivotally attached to the swinging needle-bar frame 20 by the stud 22. The stud 22 has a cylindrical portion adjacent the head which is eccentric with a cylindrical portion at the rear of the stud. It is thus possible to rotate the stud so as to shift the eccentric portion together with the swinging frame 20 and the needle bar 18 and to closely control the position of the overseamed stitches with relation to the folded edge of the fabric. A stud 74 secured in the head 13 prevents movement of the swinging frame 20 in the direction of the feed of the material. From the foregoing it will be understood that the eccentric bearing 24, through the connection 23 effects the lateral movements of the swinging frame 20 and that the amplitude of such lateral movements is controlled by the adjusting screw 65 acting upon the inner end of the screw 66, thus swinging the eccentric bearing 24 on its pivot screw 62, as best shown in Figures 1 and 3.

My pinking attachment is indicated by the numeral 85 and comprises a bracket or housing 86 preferably fastened to the lower portion of the head 13 and secured to the rear face of said head by screws 87, as best shown in Figure 2. The bracket 86 has an integral downwardly and forwardly sloping arm 88, carrying a pin 89 at the lower end of which has been mounted a roller or ball bearing 99. An arm 91 has been mounted on a pivot 92 and extends downwardly and forwardly and has a vertical shaft 93 at the lower end of which has been mounted a rotary cutter 94 having a circumferential series of cutting teeth 95. The members 90 and 94 are preferably of the same diameter and are positioned so that the point of intersection of their circumferences is in line with the center of the loop taker shaft 51, of the Singer 107W—zig-zag sewing machine with which my pinking attachment is presently shown combined, as best shown in Figure 1.

The horizontally swinging arm 91 may be swung to the left so that the rotary cutter 94 contacts in operative relation with the rotary member 90. The rotary cutter is adapted to be swung horizontally to the right away from the needle so as to permit the rethreading of the needle. For the purpose of swinging the arm 91 I have provided link mechanism or toggle joint 96 having one of its links 97 pivoted to the arm 91 and the other toggle link 98 pivotally connected to a pressure arm 99 mounted on a pin 100 in an extension 101 of the bracket 86. A lever 102 has been secured to a rotatable pin 103 in the extension 101. At the lower end of the pin 103 has been secured a crank arm 104 which is pivotally secured by a pin 105 to a toggle actuating link 106. The link 106 is pivotally connected to the links 97 and 98 by a pin 107. It is thus possible to swing the lever 102 and the crank arm 104 and the toggle actuating link 106 so as to align the two toggle links 97 and 98 and cause a pressure between the rotary cutter 94 and the ball bearing 90. A downwardly extending arm 84 serves as a stop for the arm 99.

It is to be noted that the horizontally swinging arm 91 permits swinging of one of the cutting members away from the needle 19 for the purpose of facilitating the threading of the needle. The swinging action also brings the cutting members out of operative position and permits inspection and withdrawal of the pinked materials in case the stitching is interrupted. It is also to be noted that by incorporating a toggle joint in the mechanism, the physical exertion of the female operator in actuating the lever 102 is minimized when bringing the cutting members into and out of tensioned operative engagement.

An open coil compression spring 108 in an aperture 109 of an extension 110 of the bracket 86, faces the free end of the pressure arm 99 and serves to press against said arm. This resilient pressure is transmitted by the toggle joint 96 to the rotary cutter 94 and forces the cutter against the ball bearing 90 into tensioned cutting relation. A ball headed pin 111 interposed between the pressure arm 99 and one end of the spring 108 serves to centralize the spring pressure against the pressure arm 99 in all positions assumed by the said swinging arm. An adjusting screw 112 at the opposite end of the spring serves to adjust the spring pressure against the arm 99 and to vary the tension between the cutting members 90 and 94. The spring 108 may be taken as representing any suitable means for pressing the rotary members into cutting relation. These rotary members may be spring-pressed together as shown, or may be jointly-urged into forced operative engagement by merely springing the metal arms 88 and 91 so as to cause them to yield minutely.

An annular casing 113 has been secured at the upper end of the shaft 93. The casing 113 has been recessed at its upper end forming a chamber 114 serving to house a detent carrier 115, detent rollers 116 and springs 117 which jointly form a friction clutch 118. The rollers press against cam surfaces 119 in the detent carrier 115. An oscillatable arm 120 has been fastened to the detent carrier 115 and which when turned clockwise causes rotation of the rotary cutter 94.

As shown in Figures 1 and 8, a trimmer-vibrating connection has been secured to the oscillatable arm 120 by a ball joint 122. The other end of the connection 121 has an eccentric strap 123 (Figure 3) which is designed to engage a ball-shaped eccentric 124 mounted on the needle-vibrator shaft 25. Due to the fact that the needle-vibrator shaft is geared to operate once for every two stitches, the connection 121 causes the oscillatable arm 120 to actuate the clutch 118 (Figure 10) and the rotary trimmer 94 in timed relation once for every two stitches of the sewing machine. The arm 120 has a slot 125 serving to receive the lower portion of the ball joint 122 in clamped relation. The said lower portion may comprise a threaded extension and a threaded nut which may be used for fastening the ball joint to the arm in any desired adjusted position within the limits of the slot 125. This radial adjustment along the arm 120 provides for increasing or decreasing the swing of the oscillatable arm 120 and for varying the step-by-step rotary movement of the actuating clutch 118 and the rotary cutter 94.

As shown in Figure 9, there has been provided a friction clutch 126 having clutching members similar to that of the actuating clutch 118 but interposed between the actuating clutch and the rotary cutter. The clutch 126 serves to grip the shaft 93 the moment it is released by the clutch 118 and prevents retrograde movement of the cutter 94.

As shown in Figure 1, the pinking unit 85 is secured to the head 13 of a Singer 107W—zig-zag sewing machine in such a manner as to cause the rotary members 90 and 94 to be respectively positioned on each side of the needle 19. The pinking unit 85 is thus transverse to the line of stitching of the sewing machine. As best shown in Figure 2, the pinking unit including the members 90 and 94 are positioned in advance of the needle 19 and entirely above the needle plate 28 and above the work supporting base 10. The rotary pinking members are mounted to rotate in a horizontal plane in spaced relation above the base and with their shafts in a plane mounted in angular relation with the sewing machine base.

Figure 11:
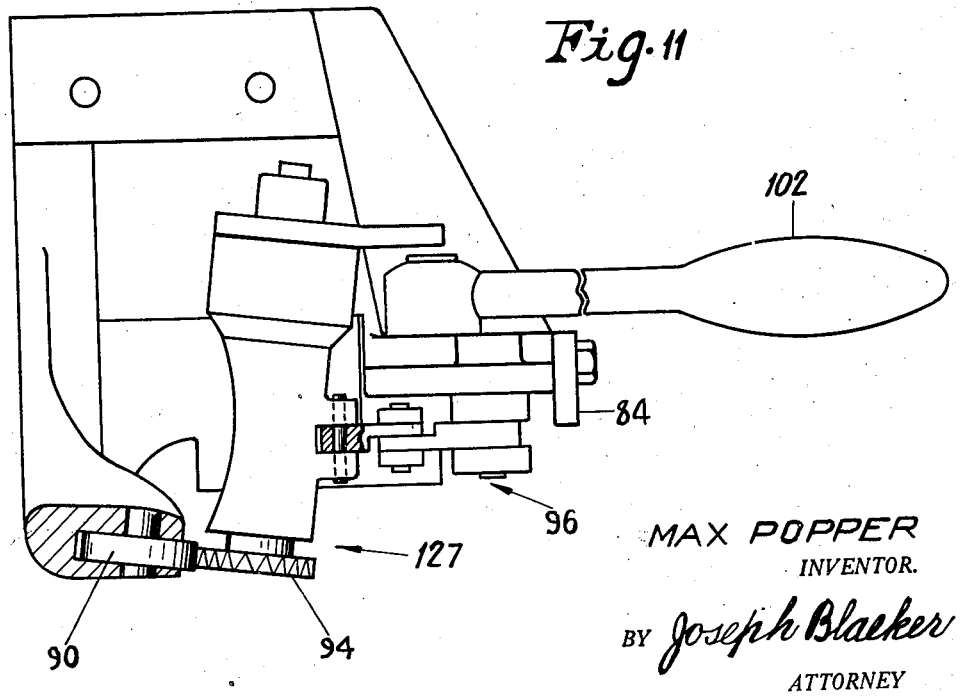
Figure 11 is a vertical elevation showing a modified pinking unit wherein the rotary cutter and the ball bearing are designed for mounting in acute angular relation with the needle plate and with the base of the sewing machine.

Figure 11 shows a modified pinking unit 127 wherein the rotary cutter 94 and the ball bearing 90 are designed for mounting in acute angular relation with the needle plate 28 and with the base 10 of the sewing machine. The angular position of the rotary cutting members causes these members to assist in downfolding the trimmed edges of the fabric sections before reaching the presser-foot 56 of the sewing machine (Figure 2).

It will be seen that both trimming units 85 and 127 are entirely above and free of the needle plate and of the sewing machine base. This type of mounting of the trimming unit permits visibility of the fabric edges worked upon at every step during their passage through the machine.

Figure 12 shows a layout in diagrammatic form whereby one embodiment of seam can be produced on the combined overseaming and pinking machine herein described. This seam indicated by the numeral 128 is a pinked and zig-zag topstitched seam and is formed with the pinked edges facing respectively in opposite directions. Referring to Figures 12 to 20, the seam 128 is made as follows: Two fabric sections 129 and 130 are positioned flat and in juxtaposed relation and with the normally exposed faces of both fabric sections lying against the base plate 10 of the combined overseaming and pinking machine. The sections 129 and 130 have their edges 131 and 132 upturned to fit into guideways 133 and 134 of a folder 135. The upturned edges 131 and 132 are presented to the pinking mechanism 85. The pinking mechanism 85 comprises the rotary cutter 94 having a zig-zag cutting surface and the rotatably mounted ball bearing or disk 90. The pinking mechanism 85 grips the upturned edge portions 131 and 132 of the fabric sections 129 and 130 and feeds them towards the needle 19 of the combined overseaming and pinking machine. The upturned edges 131 and 132 are simultaneously pinked during the movement through the pinking mechanism and are then folded down with the pinked edges facing respectively in opposite directions by a duplex hemming section 136 of the folder 135 and united together by topstitching 137. The stitching is of the zig-zag type, the fabric being pierced successively in two different and slightly spaced longitudinal lines, the threads of the stitches extending from one line to the other at uniform angles.

The seam as illustrated in Figure 15 shows the edge portions 131 and 132 of the fabric sections 129 and 130 folded flat and facing respectively in opposite directions. These folds form reinforcements against raveling. The stitching goes through a plurality of layers of fabric and reinforces the seam because any tendency to pull the seam apart causes the strain to act in the direction of the folded edges instead of against the selvage edges as heretofore. The seam shown in Figure 15 is stronger than an ordinary pinked seam wherein the sections of fabric are stitched together while lying face to face.

When two layers of fabric are pinked and stitched with the fabric sections lying flat and face to face, the stitches are visible only on the left sides of the fabrics, that is, on the normally concealed surfaces of the garments. However, when two layers of fabric are pinked and stitched with folded layers, as shown in Figure 15, the stitches are visible on the left or normally concealed side as well as on the right or normally exposed side of the fabrics and such a stitch is termed by the art a topstitch because the stitches are visible on the top face of the fabrics.

When the type of seam shown in Figure 15 is made by two sewing operations, i. e., first a combined seaming and pinking operation and then a separate topstitch operation, it is practically impossible to provide uniformly parallel lines of stitching and uniformly parallel lines of pinking and stitching. My method makes it possible not only to produce the seam in one operation, but in addition provides perfectly parallel and uniform lines of pinking and stitching.

It is to be noted that the two sections of fabric 129 and 130 are positioned on the base-plate 10 of the sewing machine with the normally exposed surfaces of the fabric sections in direct contact with said base-plate.

It is also to be noted that when the seam herein described is incorporated in shadowproof or panel garments, that there will be a plurality of superposed sections of fabric on each side of the seam and the stitching shown in Figures 12 and 15 will pass through four layers of fabric while the stitching shown in Figure 16 will pass through eight layers of fabric.

As shown in Figures 12 and 15, it will be noted that some of the stitches 138 pass through two layers of fabric sections 129 and other of the stitches 139 pass through two layers of fabric section 130. It is also to be noted that the stitching may be directed to pass through two layers of fabric as shown in Figures 12 and 15, or through four layers of fabric as shown by the stitch lines 138', 139', in Figure 16, wherein the folded edges are in superposed relation.

As best shown in Figures 17 to 20, the folder 135 used for forming the seam 128 is provided with a thin central rib 140 which may be secured to the guideway member 141 intermediate the guideways 133 and 134. A guide rib 148 fixed to a folder base-plate 149 slopes down from the upper elevation of the guideway member 141 and terminates in a line with the point of exit 142 of the duplex hemming section 136 and as close to the needle 19 as possible. The rib 148 extends substantially down to the base-plate 10. The folder 135 also comprises two plates 143 and 144 fastened to the guideway member 141 and positioned in a horizontal plane parallel with and in spaced relation from the base-plate 10. The plates 143 and 144 are spaced away from the rib 148 forming longitudinal openings 145 to permit the fabric sections 129 and 130 (Figure 12) to enter between said plates and the base-plate 10 and to turn upwards, the turned edges 131 and 132 on emerging from the guideways 133 and 134 being then constrained to follow the rib 148 on respective sides thereof till the point of exit 142 from the hemming section 136 of the folder 135, when the pinked edges are curved at the tongues 146 and then flattened in the horizontal slot-like passages 147.

Figure 20 shows the guide rib 140 pivotally mounted on a pivot 150 in a central guide member 151 which is integral with the folder base-plate 149. The central guide member 151 has a slot 152 serving to slidably support the integrally connected rib 140, the guideway member 141 and the horizontal plates 143 and 144 in pivotal relation with the folder base-plate 149. These pivotally mounted members or feed-dog pressing means may thus jointly swing up and down about the pivot 150. A spring 153 mounted in the central guideway member 151 reacts against the front end of the rib 140 and normally raises the said end and causes the end facing the needle 19, to press down. As shown in Figure 2, the horizontal plates 143, 144 extend to the forwardly sloping extension 59 of the presser-foot 56 and rest on the feed-dog 31. During the up and down motion of the feed-dog, the plates 143 and 144 move up and down concomitantly with the feed-dog. The joint up and down motion of the plates 143 and 144 and the four-motion feed-dog mechanism acting against any fabric passing between them to the needle constitutes a work feeding means 154.

As shown in Figure 5, the needle plate 28 has an integral central bar 155 which is assembled in line with the center guide member 151 of the folder 135. Portions of the feed-dog move up and down in the slots 30 of the needle plate 28 on both sides of the central bar 155 and jointly feed the fabric sections. It is to be noted that the central guide rib of the folder is positioned intermediate the trimming members 90 and 94 so as to direct the upfolded edges of the fabric sections in a pre-determined path intermediate said members. As shown in Figure 20, the central guide member 151 has curved sides 156 so as to facilitate the upfolding of the fabric sections on the folder base-plate 149. The plate 149 is designed to enter a recess 157 (Figures 2 and 3) in the base-plate 10 and to lie flush with the upper surface of said base-plate.

In order to remove the pinked clippings from the line of stitching and away from the pinking mechanism, I may provide an air compressor (not shown) terminating in an air line 158 (Figures 12 and 21) positioned close to the exit end of the pinking mechanism 85. A jet of compressed air may thus be directed crosswise to the line of pinking to blow the pinked clippings out of the way of the line of stitching.

In operating, the edges of the juxtaposed fabric sections on the base plate 10 are first turned up and pinked, the pinked edges are then downfolded with the pinked edges respectively facing in opposite directions and sewed together to form a flat pinked and topstitched seam. This makes an ornamented and reinforced seam which can be very readily made by my combined pinking and zig-zag topstitch sewing machine in one continuous operation.

Figure 22 shows a layout in diagrammatic form whereby another embodiment of seam different from the seam 128 can be produced on the combined overseaming and pinking machine herein described. This seam indicated by the numeral 168 is a pinked and zig-zag topstitched seam and is formed with the pinked edges in superposed relation and facing in one direction. Referring to Figures 22 to 30, the seam 168 is made as follows:

Two fabric sections 169 and 170 are positioned flat and in juxtaposed relation and with the normally exposed faces of both fabric sections lying against the base plate 10 of the combined overseaming and pinking machine. The sections 169 and 170 have their edges 171 and 172 upturned to fit into guideways 173 and 174 of a folder 175. The upturned edges 171 and 172 are presented to the pinking mechanism 85. The pinking mechanism 85 comprises the rotary cutter 94 having a zig-zag cutting surface and the rotatably mounted ball bearing or disk 90. The pinking mechanism 85 grips the upturned edge portions 171 and 172 of the fabric sections 169 and 170. The upturned edges 171 and 172 are simultaneously pinked during the movement through the pinking mechanism and are then folded down with the pinked edges into superposed relation and facing in one direction by a hemming section 176 of the folder 175 and united together by topstitching 177. The stitching is of the zig-zag type; the fabric being pierced successively in two different and slightly spaced longitudinal lines, the threads of the stitches extending from one line to the other at uniform angles. As shown in Figure 22, it will be noted that some of the stitches 178 pass through both sections of fabric 169 and 170 and other of the stitches 179 pass through but one of the sections 169.

The seam as illustrated in Figure 25 shows the edge portion 172 of the fabric section 170 folded flat and with the edge portion 171 of the fabric section 169 lying in superposed relation on the said fold. This fold forms a reinforcement. The stitching 178 goes through a plurality of layers of fabric and reinforces the seam because any tendency to pull the seam apart causes the strain to act in the direction of the folded edge instead of against the selvage edge as heretofore. The seam shown in Figure 25 is stronger than an ordinary pinked seam wherein the sections of fabric are stitched together while lying face to face.

When two layers of fabric are pinked and stitched with the fabric sections lying face to face, the stitches are visible on the left sides of the fabrics; that is, on the normally concealed surfaces of the garment. However, when two layers of fabric are pinked and stitched with one folded layer and one superposed layer, as shown in Figure 25, the stitches are visible on the left or normally concealed side as well as on the right or normally exposed side of the fabrics and such a stitch is termed by the art a topstitch.

When the type of seam shown in Figure 25 is made by two sewing operations, i e., first a combined seaming and pinking operation and then a separate topstitch operation, it is practically impossible to provide uniformly parallel lines of stitching and uniformly parallel lines of pinking and stitching. My method makes it possible not only to produce the seam in one operation, but in addition provides perfectly parallel and uniform lines of pinking and stitching.

It is also to be noted that the stitching, whether single stitch, multiple stitch or zig-zag stitch, may be directed to pass through the three layers of fabric at the fold as shown by the stitch lines 178', 179' in Figure 26.

As best shown in Figures 27 to 30, the folder 175 used for forming the seam 168 is provided with a thin central rib 180 which may be secured to the guideway member 191 intermediate the guideways 173 and 174. A guide rib 188 fixed to a folder base-plate 189 slopes down from the upper elevation of the guideway member 191 and terminates in a line with the point of exit 182 of the hemming section 176 and as close to the needle 19 as possible. The rib 188 extends substantially down to the base-plate 10. The folder 175 also comprises two plates 183 and 184 fastened to the guideway member 191 and positioned in a horizontal plane parallel with and in spaced relation from the base-plate 10. The plates 183 and 184 are spaced away from the rib 188 forming longitudinal openings 185 to permit the fabric sections 169 and 170 (Figure 22) to enter between said plates and the base-plate 10 and to turn upwards, the upturned edges 171 and 172 on emerging from the guideways 173 and 174 being then constrained to follow the rib 188 on respective sides thereof till the point of exit 182 from the hemming section 176 of the folder 175, when the pinked edges are curved at the tongue 186 and then flattened in superposed relation in the horizontal slot-like passage 187 adjacent the needle 19.

Figure 28 shows the guide rib 180 pivotally mounted on a pivot 190 in the guideway member 191 which is integral with the folder base-plate 189. The central guide member 191 has a slot 192 serving to slidably support the integrally connected rib 180, the guideway member 191 and the horizontal plates 183 and 184 in pivotal relation with the folder base-plate 189. These pivotally mounted members or feed-dog pressing means may thus jointly swing up and down about the pivot 190. A spring 193 mounted in the central guideway member 191 reacts against the front end of the rib 180 and normally raises the said end and causes the plates 183 and 184 at the exit end 182 facing the needle 19 to press down. The horizontal plates 183, 184 are designed to extend to the forwardly sloping extension 59 of the presser-foot 56 and rest on the feed-dog 31. During the up and down motion of the feed-dog, the plates 183 and 184 will move up and down concomitantly with the feed-dog. The joint up and down motion of the plates 183 and 184 and the four-motion feed-dog mechanism acting against any fabric passing between them to the needle constitutes a work feeding means 194.

It is to be noted that the lower surface of the trimming members 90 and 94 is free and above and in spaced relation from the feed-dog pressing means 143, 144, and the feed-dog pressing means 183, 184.

The integral central bar 155 of the needle plate 28 is assembled in line with the center guide member 191 of the folder 175. Portions of the feed-dog move up and down in the slots 30 of the needle plate 28 on both sides of the central bar 155 and jointly feed the fabric sections. It is to be noted that the central guide rib of the folder is positioned intermediate the trimming members 90 and 94 so as to direct the upfolded edges of the fabric sections in a predetermined path intermediate said members. As shown in Figure 30, the central guide member 191 has curved sides 196 so as to facilitate the upfolding of the fabric sections on the folder base-plate 189. The plate 189 is designed to enter the recess 157 (Figures 2 and 3) in the base-plate 10 and to lie flush with the upper surface of said base-plate.

In order to remove the trimmed clippings from the line of stitching and away from the trimming mechanism, I may provide air blowing means (not shown) terminating in an air line 198 (Figure 22) positioned substantially tangent to the trimming members and close to the exit end of the trimming mechanism 85. Compressed air may thus be directed substantially crosswise to the line of trimming to blow the trimmed clippings out of the way of the line of stitching. The jet of air bends the trimmed upfolded edges of the fabric sections 169 and 170 downward in a direction the edges assume in the downfolding portion 176 of the folder 175.

In operation when forming the seam 168 the edges of the juxtaposed fabric sections on the base plate 10 are first turned up and pinked, the pinked edges are then downfolded in superposed relation with the pinked edges facing in the same direction and sewed together to form a flat pinked and topstitched seam which is made on the combined overseaming and pinking machine herein described in one continuous operation. The unfolded section 169 lies on top of the folded section 170 or at a higher level. This high level unfolded section is pressed down to the throat plate or needle plate level of the folded section. The result is that the normally exposed surfaces of both sections lie downpressed to a single plane against the needle plate. In this position, the zig-zag stitches unite the two sections and hold them permanently united in a single plane. The two sections appear to the eye as though they were a single section or layer of fabric.

From the foregoing it will be seen that there has been disclosed means for producing a number of different seams having zig-zag stitching and pinked edges with the zig-zag stitches passing transversely over the line of seam formation. The seams thus produced are reinforced elastic seams with pinked edges and formed in a single continuous operation. This machine is adapted for producing quite a variety of similar seams.

As shown in Figure 33, the machine herein disclosed can also produce an overedge seam with trimmed non-ornamented edges. In this trimming unit 197, a straight edge trimming wheel 200 is used operating against a roller or ball bearing 199.

It is to be noted that in prior art pinking it has been customary to use a sewing machine having a vertically reciprocable needle which produces straight line stitching, that is a line of stitches parallel to the line of feeding. Such stitching cannot yield or stretch with fabric sections cut on a bias. In the ladies' silk underwear line, the fabric sections forming the garments are cut on the bias in order to produce form-fitting garments. When a seam is formed with straight line stitches on bias-cut sections of fabric, the least stretching applied to the seam causes the thread to break and opens the seam. Due to the fact that I employ zig-zag stitching, my invention makes it possible to produce a superior product having a pinked seam which is elastic and which will yield with the bias sections when subjected to any stretching and the seams will not open up.

The zig-zag stitching is substantially transverse to the line of feed, and the individual stitches are in line of crosswise stretching and any tendency to destroy the seam is counteracted by the fact that the wavy form assumed by the thread causes the consumption of a greater length of thread than that used in straight line stitching and this excess thread permits the seam to yield without any danger of tearing the thread. When a garment having my design of pinked and zig-zag stitched seams is stretched, the angles of the stitches become more obtuse and the seam merely becomes narrower during the period when the force is exerted and the moment the stretching is removed, the seam resumes its normal width without breaking the thread, as shown in Figures 31 and 32.

I claim:

1. In a combined seaming and trimming machine, a work supporting base, a vibratory needle, a trimming unit positioned in advance of the needle and entirely above the base and including a rotary trimming wheel and a cooperating cylindrical member.

2. In a combined seaming and trimming machine, a work supporting base, a vibratory needle, a trimming unit positioned in advance of the needle and entirely above the base and including a rotary trimming wheel and a cooperating cylindrical member, and guiding means for upfolding fabric sections on said base into operative relation with said trimming unit.

3. In a combined seaming and trimming machine, a work supporting base, a vibratory needle, a trimming unit positioned in advance of the needle and entirely above the base and including a rotary trimming wheel and a cooperating cylindrical member, and guiding means for upfolding fabric sections on said base intermediate said trimming wheel and said cylindrical member.

4. In a combined seaming and trimming machine, a work supporting base, a vibratory needle, a trimming unit positioned in advance of the needle and entirely above the base and including a rotary trimming wheel and a cooperating cylindrical member, guiding means in front of said trimming unit for upfolding fabric sections on said base, further guiding means in the rear of said trimming unit for downfolding said trimmed fabric sections before reaching said needle.

5. In a combined seaming and trimming machine, a work supporting base, a vibratory needle, a trimming unit positioned in advance of the needle and entirely above the base and including a rotary trimming wheel and a cooperating cylindrical member, guiding means in front of said trimming unit for upfolding fabric sections on said base, further guiding means in the rear of said trimming unit for downfolding said trimmed fabric sections before reaching said needle, and means for forcing said trimming wheel against said cylindrical member to cause said trimming unit to feed said fabric sections towards the needle.

6. In a combined seaming and trimming machine, a work supporting base, a vibratory needle, a trimming unit positioned in advance of the needle and entirely above the base and including a rotary trimming wheel and a cooperating cylindrical member, and means for resiliently forcing said trimming wheel against said cylindrical member.

7. In a combined seaming and trimming machine, a work supporting base, a vibratory needle, a trimming unit positioned in advance of the needle and entirely above the base and including a rotary trimming wheel and a cooperating cylindrical member, means for forcing said trimming wheel into tensioned cutting relation and means for varying said tension.

8. In a combined seaming and trimming machine, a work supporting base, a vibratory needle, and rotary work trimming means comprising two cylindrical spring-pressed members disposed in advance of the needle and entirely above said base, said trimming means being mounted to rotate in a horizontal plane and to trim fabric edges positioned in right angular relation with said base.

9. In a combined seaming and trimming machine, a work supporting base, a vibratory needle, and rotary work trimming means disposed in advance of the needle and entirely above said base, said trimming means being mounted to rotate in a horizontal plane.

10. In a combined seaming and trimming machine, a work supporting base, a vibratory needle, and rotary work trimming means disposed in advance of the needle and entirely above said base, said trimming means being mounted to rotate in a horizontal plane and in timed relation with the seaming means.

11. In a sewing machine having a base, an overhanging bracket-arm having a head, the combination of a rotary trimmer, means for rotating said trimmer, means for mounting said rotary trimmer in operative position and comprising an arm pivotally mounted on said head to swing horizontally parallel to said base and being constantly free of said base.

12. In a sewing machine having a base, an overhanging bracket-arm having a head, the combination of a rotary trimmer, means for rotating said trimmer, means for mounting said rotary trimmer in operative position and comprising an arm pivoted to said head at the lower end thereof and being constantly free of said base, said arm being concentrically supported on said pivot for horizontal swinging movement jointly with said trimmer.

13. In a sewing machine having a base, an overhanging bracket-arm having a head, the combination of a rotary trimmer, means for rotating said trimmer, means for mounting said rotary trimmer in operative position and comprising an arm pivoted to said head at the lower end thereof and being constantly free of said base, said arm being concentrically supported on said pivot for horizontal swinging movement, means for mounting said rotary trimmer on said arm and toggle means for swinging said arm and trimmer into and out of operative position.

14. In combination with a sewing machine having a vibratory needle, a rotary pinking unit comprising two cylindrical cooperating rotary members, said needle being positioned intermediate said rotary pinking members.

15. In combination with a sewing machine having a vibratory needle, a rotary pinking unit comprising two cylindrical cooperating rotary members, said needle being positioned intermediate said rotary pinking members and in the rear thereof.

16. In combination with a sewing machine having a vibratory needle, a rotary pinking unit comprising two cylindrical cooperating rotary members, said needle being positioned intermediate said rotary pinking members and in the rear thereof, said pinking members being mounted transverse to the line of stitching.

17. In combination with a sewing machine having a vibratory needle, a rotary pinking unit comprising two cylindrical cooperating rotary members, said needle being positioned intermediate said rotary pinking members and in the rear thereof, said pinking members being mounted transverse to the line of stitching and to rotate parallel to the base of the sewing machine.

18. In combination with a sewing machine having a vibratory needle, a rotary pinking unit comprising two cylindrical cooperating rotary members, said needle being positioned intermediate said rotary pinking members and in the rear thereof, said pinking members being mounted transverse to the line of stitching and to rotate parallel to the base of the sewing machine and in spaced relation above said base.

19. In combination with a sewing machine having a needle, a rotary pinking unit comprising two cylindrical cooperating rotary members, said needle being positioned intermediate said rotary pinking members and in the rear thereof, said pinking members being mounted transverse to the line of stitching and to rotate parallel to the base of the sewing machine and in spaced relation above said base.

20. In a sewing machine having a base, an overhanging bracket-arm having a head, an arm mounted for horizontal swinging motion below said head and being pivoted relative to said head, a rotary trimmer mounted at the free end of said arm, means for swinging said arm and trimmer into and out of operative position and resilient means for forcing said trimmer against a revolving member operatively secured to said head.

21. In a sewing machine having a base, an overhanging bracket-arm having a head, means for supporting a rotary pinking unit from said head and means operative by the sewing machine actuating means to operate said unit in a horizontal plane parallel to and free of said base.

22. In a sewing machine having a base, an overhanging bracket-arm having a head and means for supporting a rotary trimming mechanism from said head and in operative position free of and above said base, said trimming mechanism including a pair of rotary cooperating members.

23. In a sewing machine having a base, an overhanging bracket-arm having a head and means for supporting a rotary trimming mechanism from said head and in operative position free of and above said base, said trimming mechanism including a pinking wheel and a cooperating rotary member in operative position above said base.

24. In a sewing machine having a base, an overhanging bracket-arm having a head and means for supporting a pinking unit from said head and in operative position free of and above said base, said unit comprising cooperating rotary members respectively positioned on each side of the needle of the sewing machine.

25. In a sewing machine having a base, an overhanging bracket-arm having a head and means for supporting a pinking unit from said head and in operative position free of and above said base, said pinking unit comprising a pinking wheel and a rotatably mounted cylindrical member, said pinking wheel and said cylindrical member being mounted with their axes in angular relation with said base and means for yieldingly forcing said pinking wheel and said cylindrical member into tensioned cutting relation.

26. In a sewing machine having a base, an overhanging arm having a head, means for supporting a rotary trimming mechanism from said head and in operative position free of and above said base, said trimming mechanism including a set of rotary cooperating members mounted with their axes in a vertical plane and designed to operate in a horizontal plane parallel to said base.

27. In a sewing machine having a base, an overhanging arm having a head, means for supporting a pinking wheel and a cooperating cylindrical member from said head with their axes in a vertical plane, a friction clutch mounted above the pinking wheel and means for operating said clutch.

28. In a sewing machine having a base, an overhanging arm having a head, means for supporting a rotary trimmer and a freely rotatable cylindrical member from the lower end of said head and above said base, the axes of both of said rotary members being in angular relation with said base, and means for rotating said trimmer.

29. In a sewing machine having a base, an overhanging arm having a head, means for supporting a rotary pinker and a freely rotatable cylindrical member from the lower end of said head and above said base, the axes of said rotary members being in angular relation with said base, a clutch operatively connected with said pinker and means for driving said clutch step-by-step from the sewing machine driving means.

30. In a sewing machine having a base, an overhanging arm having a head, means for supporting a rotary pinker and a freely rotatable cylindrical member from said head and above said base, the shafts of said rotary members being in angular relation with said base, a main driving shaft in said arm, a shaft transverse and below said main driving shaft and having an eccentric thereon, a clutch at the upper end of the pinker shaft and a pitman connected with said eccentric and said clutch for rotating said pinker.

31. In a sewing machine having a base, an overhanging arm having a head, means for supporting a rotary trimmer and a freely rotatable cylindrical member from said head and above said base, said rotary members being mounted to rotate in inclined relation with said base and means for rotating said rotary trimmer.

32. In a combined overedge sewing and pinking machine, the combination of stitch forming means including a vibratory needle, means to support two sections of fabric with the two edge portions thereof upfolded in angular relation with the base of the sewing machine, means to guide the two edge portions towards the needle and intermediate two rotary pinking members, means to pink the two upfolded edges, means for downfolding the pinked edges and means for zig-zag stitching over the folded edge of the fabric sections and forming an overedged seam with two pinked edges.

33. In a sewing machine having a needle plate, an overhanging arm having a head, means for supporting a rotary trimming unit comprising two cylindrical spring-pressed members from said head and in front and free of the needle plate, means for rotating the trimmer and means for preventing retrograde movement of said trimmer.

34. In a sewing machine having a needle plate and a base, an overhanging arm, a rotary trimming unit comprising two cylindrical spring-pressed members mounted free and above said needle plate and rotated by the sewing machine driving means and means for preventing retrograde movement of said trimmer.

35. In a sewing machine having a needle and a needle plate, an overhanging arm, a rotary trimmer mounted for horizontal rotation and horizontal swinging movement above and free of said needle plate, means for rotating the trimmer and means for preventing retrograde movement of said trimmer.

36. In a combined seaming and trimming machine, a needle, rotary trimming means positioned to rotate horizontally in advance of the needle, and means for blowing air positioned substantially tangent to the trimming means and transverse to the line of feed of said sewing machine, said air means positioned above said trimming means and being interposed between said trimming means and said needle.

37. In a combined seaming and pinking machine, a needle, rotary pinking means positioned to rotate horizontally in advance of the needle and means positioned above said pinking means and interposed between said pinking means and said needle for removing the pinked clippings out of the way of the line of seaming and means for downfolding pinked upright edges of fabric sections.

38. In a combined seaming and pinking machine, a needle, rotary pinking means positioned to rotate horizontally in advance of the needle and means for blowing air positioned above said pinking means and interposed between said pinking means and said needle, said blowing means being positioned transverse to the line of stitching.

39. In a combined seaming and pinking machine, a needle, pinking means positioned in advance of the needle and means for blowing air interposed between said pinking means and said needle, said blowing means being positioned transverse to the line of stitching and being closer to the pinking means than to the needle.

40. In a combined seaming and pinking machine, a needle, a rotary pinking wheel and a cooperating rotary member positioned in advance of the needle and above the base, and means for blowing a jet of air in the rear of the pinking wheel and transverse to the line of pinking.

41. In combination with a sewing machine, a needle plate, a pinking mechanism comprising two cylindrical spring-pressed members positioned to rotate horizontally in spaced relation above said needle plate, means for blowing a jet of air transverse to the line of pinking and means for downfolding trimmed upright edges of fabric sections.

42. In combination with a sewing machine, a needle plate, an edge trimming mechanism comprising two cylindrical spring-pressed members positioned to rotate horizontally in spaced relation above said needle plate, means for blowing a jet of air transverse to the line of trimming and means for downfolding trimmed upright edges of fabric sections.

43. In a combined seaming and trimming machine comprising two cooperative horizontally rotatable spring-pressed trimming members mounted to operate in a horizontal plane, means for upturning the edges of juxtaposed fabric sections in position for trimming, means for blowing a jet of air in a direction to cause removal of the trimmed clippings and means for downfolding said trimmed edges prior to seaming.

44. An attachment for sewing machines having a base and an overhanging arm terminating in an upright head, a pair of rotary cooperating edge trimming members supported from said head, said members being positioned above the base and in front of the needle, one member being mounted to freely rotate horizontally on a fixed shaft and the other member being swingable and mounted to be rotated horizontally by a rotatable shaft and means for resiliently forcing said swinging member against the member having a fixed axis.

45. In combination with a sewing machine having a shaft mounted below and transverse with the main actuating shaft, said main shaft having a gear mounted thereon and being operatively associated with a gear mounted on said transverse shaft for driving said shaft, said transverse shaft having an eccentric member, a link member having its upper end in engagement with said eccentric, a pinking attachment mounted above the base of said sewing machine and having a rotary pinking wheel and an oscillatable arm for rotating said wheel, said arm having means thereon for engagement with the lower end of said link member and being thereby constrained to oscillate solely due to the motion of said transverse shaft.

46. In combination with a sewing machine having a shaft mounted below and transverse with the main actuating shaft, said main actuating shaft having a gear mounted thereon and being operatively associated with a gear mounted on said transverse shaft for driving said shaft, said transverse shaft having an eccentric member, a link member having its upper end in engagement with said eccentric member, a pinking attachment mounted above the base of said sewing machine and having a rotary pinking wheel and an oscillatable arm for rotating said wheel, means for connecting said arm with the lower end of said link member and causing said pinking wheel to rotate due to the motion of said transverse shaft.

47. In combination with a sewing machine having a needle plate and a shaft mounted below and transverse with the main actuating shaft, said main actuating shaft having a gear mounted thereon and being operatively associated with a gear mounted on said transverse shaft for driving said shaft, said transverse shaft having an eccentric, a pendant link member having its upper end in engagement with said eccentric, a pinking attachment mounted above and free of the needle plate and having an arm for actuating a cutting member, means for connecting said arm with the lower end of said link member and causing said arm to oscillate due to the motion of said transverse shaft, and a lever for swinging the cutting member out of cutting engagement.

48. In combination with a sewing machine having a shaft mounted transverse with the main actuating shaft, said main actuating shaft having gear means mounted thereon and being intermeshed with gear means mounted on said transverse shaft for driving said shaft, said transverse shaft having a ball-shaped eccentric, a link member having its upper end in engagement with said eccentric, a pinking attachment mounted above and free of the needle plate of said sewing machine and having a rotary pinking wheel and an oscillatable arm for rotating said wheel, said arm having means thereon for engagement with the lower end of said link member and being thereby constrained to oscillate due to the motion of said transverse shaft.

49. In a sewing machine, the combination of stitching mechanism, a circular cutter for trimming the stitched edges of fabric sections, said cutter being located in angular relation to the needle with its axis in advance of the needle of the sewing machine, and eccentrically operated means for rotating the cutter step-by-step in timed relation with the sewing machine feeding means.

50. In a sewing machine, the combination of stitching mechanism, a circular cutter for trimming the edges of fabric sections, said cutter being located in angular relation to the needle with its axis in advance of the needle of the sewing machine, eccentrically operated means for rotating the cutter step-by-step in timed relation with the sewing machine feeding means, means for exerting pressure against the cutter and means for swinging said cutter in and out of engagement with a cooperating rotary member and including a lever.

51. In a combined seaming and trimming machine, a work supporting base, a vibratory needle and a trimming unit comprising two cylindrical spring-pressed members positioned to rotate horizontally and trim upright edges in advance of the needle and entirely above the base.

52. In a combined seaming and trimming machine, a work supporting base, a vibratory needle and a trimming unit comprising two cylindrical spring-pressed members positioned to rotate horizontally and trim upright edges entirely above said base.

53. In combination with a sewing machine having stitching mechanism, a pinking unit comprising two cylindrical spring-pressed members positioned to rotate horizontally and trim upright edges entirely above the needle plate of said sewing machine and driven by the sewing machine driving means.

54. In combination with a sewing machine having stitching mechanism, a pinking unit comprising two cylindrical spring-pressed members positioned to rotate horizontally and trim upright edges entirely above the needle plate of said sewing machine and driven by the sewing machine driving means and means for blowing a jet of air in a direction to cause removal of the pinked clippings.

55. In combination with a sewing machine having a vibratory needle and a transverse lockstitch rotary hook or loop taker, a pinking unit comprising two cooperating rotary members mounted above the sewing machine base and respectively positioned on each side of the needle.

56. In combination with a sewing machine having a vibratory needle and a transverse lockstitch rotary hook or loop taker, a pinking unit positioned in front of the needle and mounted to operate in a horizontal plane and trim upturned fabric edges and being mounted above the sewing machine base and operative by the sewing machine actuating means.

57. In combination with a sewing machine having a vibratory needle and a transverse lockstitch rotary hook or loop taker, a pinking unit positioned in front of the needle and mounted to operate in a horizontal plane and trim upturned fabric edges and being operatively associated in unison with said sewing machine and driven by the sewing machine actuating means.

58. In a combined overedge sewing and pinking machine, the combination of stitch forming means including a vibratory needle, means to support two sections of fabric with the two edge portions thereof in juxtaposed relation on the base of the sewing machine, means to guide the two edge portions upwardly towards and intermediate two rotary pinking members, means to pink the two upfolded edges and feed said sections into a downfolder, means for downfolding the pinked edges, means for feeding the downfolded edges to the needle and means for zig-zag stitching over the folded edge of the fabric sections and forming an overedged seam with two pinked edges.

59. In a combined overedge sewing and pinking machine, the combination of stitch forming means including a vibratory needle, means to support two sections of fabric with the two edge portions thereof in juxtaposed relation on the base of the sewing machine, means to guide the two edge portions upwardly towards and intermediate two rotary pinking members, means to pink the two upfolded edges and feed said sections into a downfolder, means for downfolding the pinked edges, means for feeding the downfolded edges to the needle and comprising spring-pressed members pivotally mounted for swinging motion and pressing against the feed-dog of the sewing machine and means for zig-zag stitching over the folded edge of the fabric sections and forming an overedged seam with two pinked edges.

60. In a combined overedge sewing and pinking machine, the combination of stitch forming means including a vibratory needle, means to support two sections of fabric with the two edge portions thereof in juxtaposed relation on the base of the sewing machine, means to guide the two edge portions upwardly towards and intermediate two rotary pinking members, means to pink the two upfolded edges and feed said sections into a downfolder, means for downfolding the pinked edges, means for feeding the downfolded edges to the needle and comprising spring-pressed members pivotally mounted for upward and downward motion jointly with the feed-dog of the sewing machine and means for zig-zag stitching over the folded edge of the fabric sections and forming an overedged seam with two pinked edges.

61. In a combined overedge sewing and pinking machine, the combination of stitch forming means including a vibratory needle, means to support two sections of fabric with the two edge portions thereof in juxtaposed relation on the base of the sewing machine, means to guide the two edge portions upwardly towards and intermediate two rotary pinking members, means to pink the two upfolded edges and feed said sections into a downfolder, means for downfolding the pinked edges, means for feeding the downfolded edges to the needle and comprising spring-pressed members pivotally mounted and resting on the feed-dog of the sewing machine and designed for upward and downward movement concomitantly with said feed-dog and means for zig-zag stitching over the folded edge of the fabric sections and forming an overedged seam with two pinked edges.

62. In a combined pinking and sewing machine having a presser foot and a feed-dog cooperatively associated with a needle, two rotary spring-pressed members designed to feed and design trim upfolded edges of material and being mounted above the base of the sewing machine, auxiliary work feeding means in the front of the needle, said means comprising spring-pressed and pivotally mounted members resting on said feed-dog and designed for upward and downward movement concomitantly with said feed-dog.

63. In a combined pinking and sewing machine having a presser foot and a feed-dog cooperatively associated with a needle, two rotary spring-pressed members designed to feed and design trim upfolded edges of material and being mounted above the base of the sewing machine, auxiliary work feeding means in the front of the needle, said means comprising spring-pressed members resting on said feed-dog and designed for upward and downward movement concomitantly with said feed-dog.

64. In a combined sewing and trimming machine having a presser foot and a feed-dog, two rotary spring-pressed members designed to feed and trim upfolded edges of material, means for feeding downfolded edges of said material to the presser foot, and means for feeding said downfolded edges away from the presser foot and the needle.

65. In a combined overedge seaming and pinking machine, two rotary spring-pressed members designed to feed and design trim upfolded edges of material and being mounted above the base of the sewing machine, a transversely movable needle, a loop taker mounted to rotate transverse to the line of feed and a needle plate having an elongated slot for said needle, said slot being positioned transverse to the line of feed of the sewing machine.

66. In a combined overedge seaming and pinking machine having a loop taker and a transversely movable needle, two rotary spring-pressed members designed to feed and design trim upfolded edges of material and being mounted above the base of the sewing machine, a needle plate having an elongated slot for said needle, said slot being positioned transverse to the line of feed of said sewing machine.

67. In a combined overedge seaming and pinking machine having a loop taker mounted on a shaft for motion transverse to the line of feed and having a transversely movable needle, two rotary spring-pressed members designed to feed and design trim upfolded edges of material and being mounted above the base of the sewing machine, a needle plate having an elongated slot for said needle, said slot being positioned transverse to the line of feed of said sewing machine.

68. In a combined overedge seaming and trimming machine having a loop taker mounted on a shaft for motion transverse to the line of feed and having a transversely movable needle, a rotary trimming unit positioned in front of the needle and mounted to operate in a horizontal plane and trim upturned fabric edges and being mounted above the base of the sewing machine, a needle plate having an elongated slot for said needle, said slot being positioned transverse to the line of feed of said sewing machine.

69. In a combined overedge seaming and edge trimming machine having a rotary trimming unit positioned in front of the needle and mounted to operate in a horizontal plane and trim upturned fabric edges and being above and free of the base of the sewing machine, a transversely to and fro movable needle and means for varying the to and fro movements of said needle.

70. In a combined overedge seaming and pinking machine, two rotary spring-pressed members designed to feed and deisgn trim upfolded edges of material and being mounted above the base of the sewing machine, a transversely to and fro movable needle and means for varying the to and fro movements of said needle.

71. In a sewing machine, the combination of four-motion feed mechanism, stitching mechanism including a vibratory needle and a needle vibrator shaft, means for trimming the edges of fabric sections with a predetermined design and comprising a rotary cutter operative as a feeding mechanism for feeding upfolded edges of the fabric sections, and means for operating said stitching mechanism and trimming means simultaneously, said trimming means being connected with the needle vibrator shaft for operation thereby.

72. In a sewing machine, the combination of four-motion feed mechanism, stitching mechanism including a vibratory needle, a needle actuating shaft and a needle vibrator shaft having a gear thereon, said gear having a ball shaped eccentric hub, means for trimming the edges of fabric sections and comprising a rotary cutter operative as a feeding mechanism for feeding upfolded edges of the fabric sections, said trimming means being connected with said ball shaped eccentric for operation thereby.

73. In a sewing machine, the combination of four-motion feed mechanism, stitching mechanism including a vibratory needle, a needle actuating shaft and a needle vibrator shaft having a gear thereon, said gear having a ball shaped eccentric hub, means for trimming the edges of fabric sections and comprising a rotary cutter operative as a feeding mechanism for feeding upfolded edges of the fabric sections, said trimming means being connected with said ball shaped eccentric for operation thereby, said eccentric being rotated once for every two revolutions of the needle actuating shaft.

74. The invention as defined in claim 73 wherein the needle actuating shaft is rotated twice for every complete to and fro transverse movement of the needle.

75. In a combined seaming and pinking machine, a transversely movable needle, a throat plate having an elongated transverse slot to receive said needle in two separated points, said pinking means being positioned in front of the needle and mounted to operate in a horizontal plane and trim upturned fabric edges and being adapted to cut a zig-zag design in the edge of the fabrics worked upon.

76. In a combined seaming and trimming machine, a transversely movable needle designed to produce zig-zag stitching, a throat plate having an elongated transverse slot to receive said needle in two separated points, said trimming means comprising two cooperating horizontally rotatable spring-pressed cylindrical members, means for upfolding the edges of two or more sections of fabric, said means being so disposed as to direct the upfolded edges in a pre-determined path intermediate said trimming members and to the needle.

77. In a combined seaming and trimming machine, a transversely movable needle designed to produce zig-zag stitching, a throat plate having an elongated transverse slot to receive said needle in two separated points, said trimming means comprising two cooperative horizontally rotatable spring-pressed cylindrical members, means for upfolding the edges of two or more sections of fabric, said means being so disposed as to direct the upfolded edges in a pre-determined path intermediate said trimming members and to the needle, said trimming means being adapted to cut an ornamental or zig-zag design in the edges of the fabrics worked upon.

78. In a sewing and fabric trimming machine of the character described, the combination with a stitch-forming and cloth-feeding mechanism including a needle-plate, a needle and a needle-carrying bar, said feeding mechanism comprising a feed-dog and spring-pressed members spaced apart and forming longitudinal opening means adapted to receive upturned fabric edges therein and guide said edges to the needle, said members resting successively on said needle-plate and on said feed-dog and being designed for upward and downward movement concomitantly with said feed-dog, said members being in frictional engagement with said feed-dog including the forward portion of the feed-dog, of a trimming mechanism including a cutting element, said element having a single cutting surface positioned in angular relation with the base of the sewing machine for cutting fabric sections positioned in upturned angular relation with said base, said trimming mechanism comprising two cooperative horizontally rotatable spring-pressed members mounted to operate in a horizontal plane.

79. In a combined seaming and trimming machine, a work supporting base, a transversely movable needle and a rotary trimming unit positioned to rotate horizontally and trim upright edges above and free of the needle plate.

80. In a combined seaming and pinking machine, a work supporting base, a transversely movable needle and a pinking unit positioned above and free of the base, said pinking unit being in front of the needle and positioned to pink fabric edges positioned in angular relation with said base.

81. In a combined seaming and pinking machine, a needle movable transversely to the line of feed and actuated to produce zig-zag stitching, and a pinking unit positioned in front of the needle and mounted to operate in a horizontal plane and pink upturned edges, said pinking unit being operatively associated with said seaming machine and driven by the seaming machine actuating means.

82. In a combined seaming and pinking machine having a base, two rotary spring-pressed members designed to feed and design trim upfolded edges of material and being mounted above the base of the sewing machine, a needle movable transversely to the line of feed and actuated to produce zig-zag stitching, a needle bar for said needle, said needle bar being supported in bearings in a transversely swinging frame pivotally mounted at its upper end, said needle being movable upwardly and downwardly in angular relation other than ninety degrees with the base.

83. In a combined seaming and pinking machine having a base, two rotary spring-pressed members designed to feed and design trim upfolded edges of material and being mounted above the base of the sewing machine, a needle movable transversely to the line of feed and actuated to produce zig-zag stitching, a needle bar for said needle, said needle bar being movable upwardly and downwardly in bearings of a swinging frame.

84. A pinking attachment for a sewing machine having a needle plate and a head, comprising in one unit for attachment to the sewing machine, a bracket structure designed for attachment as an extension of the lower end of said head and supporting two cooperating rotary pinking members in spaced relation above and free of the needle plate, a clutch attached to one of said rotary members and means for operating said clutch from the sewing machine driving means.

85. A pinking attachment for a sewing machine having a needle plate and a head, comprising in one unit for attachment to the sewing machine, a bracket structure designed for attachment as an extension of the lower end of said head and supporting two cooperating pinking members in spaced relation above and free of the needle plate, and means for operating said members in timed relation with the sewing machine stitching means.

86. A pinking attachment for a sewing machine having a needle plate and a head, comprising in one unit for attachment to the sewing machine, a bracket structure designed for attachment to the lower end of said head and supporting two cooperating pinking members operatively positioned above and free of the needle plate and means for operating said members in timed relation of two stitches to one pink.

87. A pinking attachment for a sewing machine having a needle plate and a head, comprising in one unit for attachment to the sewing machine head, means for supporting two cooperating pinking members above and free of the needle plate, means for operating said members in timed relation with the stitching of the sewing machine and means for forcing said pinking members into tensioned cutting relation.

88. A pinking attachment for a sewing machine having a needle plate, comprising in one unit for attachment to the sewing machine, means for supporting two cooperating pinking members in front of the needle and in spaced relation above and free of the needle plate, means for operating said members in timed relation with the stitching of the sewing machine and means for forcing said pinking members into tensioned cutting relation.

89. A trimming attachment for a sewing machine having a needle plate, comprising a complete trimming unit designed for attachment to the sewing machine and for supporting two co-operating trimming members above and free of the needle plate, means for operating said trimming members in timed relation of one trimming cut to two stitches of the sewing machine and means for forcing said trimming members into tensioned cutting relation.

90. A pinking attachment for a sewing machine having a head, comprising a bracket fastened to the head including a downwardly and forwardly sloping arm, a ball bearing mounted at the lower end of said arm, an arm pivotally mounted to swing in a horizontal plane and having a rotary cutter mounted at its lower end and means for resiliently forcing said cutter and said ball bearing into tensioned cutting relation.

91. A pinking attachment for a sewing machine having a head, comprising a bracket fastened to the head and having a downwardly and forwardly sloping arm, a ball bearing mounted at the lower end of said arm, an arm pivotally mounted to swing in a horizontal plane and having a shaft and a rotary cutter mounted at the lower end of said shaft, a clutch mounted at the upper end of said shaft, and means for resiliently forcing said ball bearing and said cutter into tensioned cutting relation.

92. A pinking attachment for a sewing machine having a head, comprising a bracket fastened to the head and having a downwardly and forwardly sloping arm, a ball bearing mounted at the lower end of said arm, an arm pivotally mounted to swing in a horizontal plane and having a shaft and a rotary cutter mounted at the lower end of said shaft, a clutch mounted at the upper end of said shaft, means for actuating said clutch and cutter concomitantly with said sewing machine, means for preventing retrograde movement of said cutter and resilient means for forcing said cutter against said ball bearing into tensioned cutting relation.

93. A pinking attachment for a sewing machine having a head, comprising a bracket fastened to the head and having a downwardly and forwardly sloping arm, a ball bearing mounted at the lower end of said arm, an arm pivotally mounted to swing in a horizontal plane and having a shaft and a rotary cutter mounted at the lower end of said shaft, a clutch mounted at the upper end of said shaft, means for actuating said clutch concomitantly with said sewing machine, and resilient means for forcing said cutter against said ball bearing into tensioned cutting relation.

94. A pinking attachment for a sewing machine having a head, comprising a bracket fastened to the head and having a downwardly and forwardly sloping arm, a ball bearing mounted at the lower end of said arm, an arm pivotally mounted to swing in a horizontal plane and having a shaft and a rotary cutter mounted at the lower end of said shaft, a clutch mounted at the upper end of said shaft, means for actuating said clutch and cutter concomitantly with said sewing machine, a further clutch for preventing retrograde movement of said cutter, said further clutch being mounted on said shaft and facing in the opposite direction to said actuating clutch, and resilient means for forcing said cutter against said ball bearing into tensioned cutting relation.

95. A pinking attachment for a sewing machine having a head, comprising a bracket fastened to the head and having a downwardly and forwardly sloping arm, a ball bearing mounted at the lower end of said arm, an arm pivotally mounted to swing in a horizontal plane and having a shaft and a rotary cutter mounted at the lower end of said shaft, a clutch mounted at the upper end of said shaft, means for actuating said clutch and cutter concomitantly with said sewing machine, a further clutch for preventing retrograde movement of said cutter, said further clutch being mounted on said shaft and facing in the opposite direction to said actuating clutch, said further clutch being interposed between said actuating clutch and said cutter, and resilient means for forcing said cutter against said ball bearing into tensioned cutting relation.

96. A pinking attachment for a sewing machine having a head, comprising a bracket fastened to the head and having a downwardly and forwardly sloping arm, a ball bearing mounted at the lower end of said arm, an arm pivotally mounted to swing in a horizontal plane and having a shaft and a rotary cutter mounted at the lower end of said shaft, a clutch mounted at the upper end of said shaft, an oscillatable arm fastened to said clutch and carrying a pitman for actuating said clutch and cutter concomitantly with said sewing machine, a further clutch for preventing retrograde movement of said cutter, said further clutch being mounted on said shaft and facing in the opposite direction to said actuating clutch, said further clutch being interposed between said actuating clutch and said cutter, and resilient means for forcing said cutter against said ball bearing into tensioned cutting relation.

97. A pinking attachment for a sewing machine having a head, comprising a bracket fastened to the head and having a sloping arm, a rotary member mounted at the lower end of said arm, an arm pivotally mounted to swing in a horizontal plane and having a shaft and a rotary cutter mounted at the lower end of said shaft, a clutch mounted at the upper end of said shaft, an arm fastened to said clutch and carrying means for actuating said clutch and cutter concomitantly with said sewing machine, a further clutch for preventing retrograde movement of said cutter, said further clutch being interposed between said actuating clutch and said cutter, and resilient means for forcing said cutter against said rotary member.

98. In a combined seaming and trimming machine, a work supporting base, a vibratory needle, a trimming unit positioned in advance of the needle and entirely above the base and including a rotary trimming wheel and a cooperating cylindrical member, guiding means in front of said trimming unit for upfolding fabric sections on said base, further guiding means in the rear of said trimming unit for downfolding said trimmed fabric sections before reaching said needle, and means for blowing a jet of air against said trimmed fabrics.

99. In a combined seaming and trimming machine, a work supporting base, a vibratory needle, a trimming unit positioned in advance of the needle and entirely above the base and including a rotary trimming wheel and a cooperating cylindrical member, guiding means in front of said trimming unit for upfolding fabric sections on said base, further guiding means in the rear of said trimming unit for downfolding said trimmed fabric sections before reaching said needle, means for blowing a jet of air against said trimmed fabrics, said air jet being interposed between said trimming unit and said needle.

100. In a combined seaming and trimming machine, the combination with a stitch-forming and cloth-feeding mechanism including a needle-plate, a needle, a feed-dog, and spring-pressed means pressing on said feed-dog, said trimming mechanism comprising two cylindrical spring-pressed members mounted to rotate horizontally in spaced relation above said needle-plate and above said feed-dog pressing means, means for rotating one of said trimming members step-by-step in timed relation with said cloth-feeding means, means for preventing retrograde movement of said rotated trimming member, means to support two sections of fabric with edge portions thereof in horizontal juxtaposed relation, means to guide the two edge portions upwardly toward the trimming mechanism, said feed-dog pressing means comprising two members spaced apart and forming opening means adapted to receive said upturned edges and guide said edges through said trimming mechanism and toward the needle, means for downfolding said trimmed edges before reaching said needle, said spaced and spring-pressed members being in frictional contact with said feed-dog including the forward portion thereof, means for blowing a jet of air against said trimmed upturned edges in a direction to cause removal of the trimmed clippings out of the way of the line of seaming and means for stitching the downfolded fabric with zig-zag stitches and forming an edge-folded and trimmed elastic seam with the stitched portion of the folded edge flattened by said transverse stitches and lying substantially flat on the normally exposed surface of the garment.

MAX POPPER.